United States Patent
Huang et al.

(10) Patent No.: US 10,567,268 B2
(45) Date of Patent: Feb. 18, 2020

(54) METHOD FOR DETECTING TOPOLOGY, COMPUTE NODE, AND STORAGE NODE

(71) Applicant: Wiwynn Corporation, New Taipei (TW)

(72) Inventors: Kuo-Yi Huang, New Taipei (TW); Pei-Ling Yu, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 125 days.

(21) Appl. No.: 15/981,904

(22) Filed: May 17, 2018

(65) Prior Publication Data

US 2019/0253337 A1  Aug. 15, 2019

(30) Foreign Application Priority Data

Feb. 13, 2018  (TW) .............................. 107105309 A

(51) Int. Cl.
| | | |
|---|---|---|
| *H04L 12/751* | (2013.01) | |
| *G06F 13/36* | (2006.01) | |
| *H04L 12/403* | (2006.01) | |
| *H04L 29/12* | (2006.01) | |
| *H04L 29/08* | (2006.01) | |

(52) U.S. Cl.
CPC .............. *H04L 45/02* (2013.01); *G06F 13/36* (2013.01); *H04L 12/403* (2013.01); *H04L 61/6022* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,614,764 | B1* | 9/2003 | Rodeheffer | H04L 12/462 370/254 |
| 9,769,054 | B2* | 9/2017 | Wang | H04L 41/12 |
| 10,362,375 | B2* | 7/2019 | Goodrum | H04L 43/0811 |
| 2003/0093509 | A1* | 5/2003 | Li | G06F 11/0727 709/223 |
| 2003/0120780 | A1* | 6/2003 | Zhu | G06F 9/50 709/226 |
| 2003/0216143 | A1* | 11/2003 | Roese | G01S 5/02 455/456.1 |
| 2004/0221041 | A1* | 11/2004 | Tabbara | H04L 69/40 709/227 |
| 2008/0123559 | A1* | 5/2008 | Haviv | G06F 8/61 370/255 |
| 2009/0116404 | A1* | 5/2009 | Mahop | H04L 41/0213 370/254 |
| 2009/0249213 | A1* | 10/2009 | Murase | H04L 41/12 715/735 |

(Continued)

*Primary Examiner* — Jamaal Henson
(74) *Attorney, Agent, or Firm* — JCIPRNET

(57) ABSTRACT

A method for detecting topology, a compute node, and a storage node are proposed. In this disclosure, the compute node and the storage node exchange identity information with each other. Next, each of the compute node and the storage node combines the identity information thereof and the identification information of the other based on the same rule to generate the same connection identification for characterizing the connection relationship between the compute node and the storage node. Accordingly, the maintenance and management of a data center may be more convenient and less expensive.

14 Claims, 2 Drawing Sheets

(56) References Cited

U.S. PATENT DOCUMENTS

| | | | |
|---|---|---|---|
| 2012/0110160 A1* | 5/2012 | Papadopoulos | G06F 11/3006 709/224 |
| 2012/0151026 A1* | 6/2012 | Chen | H04L 12/6418 709/223 |
| 2014/0281094 A1* | 9/2014 | Nelson | G06F 13/4068 710/301 |
| 2015/0350322 A1* | 12/2015 | Akaike | G06F 3/0629 707/827 |
| 2016/0275085 A1* | 9/2016 | Soundararajan | G06F 16/122 |
| 2017/0164077 A1* | 6/2017 | Goodrum | H04L 43/10 |
| 2017/0316018 A1* | 11/2017 | Guo | H04L 43/0805 |
| 2018/0176093 A1* | 6/2018 | Katz | G06F 9/5061 |

\* cited by examiner

METHOD FOR DETECTING TOPOLOGY, COMPUTE NODE, AND STORAGE NODE

CROSS-REFERENCE TO RELATED APPLICATION

This application claims the priority benefit of Taiwan application serial no. 107105309, filed on Feb. 13, 2018. The entirety of the above-mentioned patent application is hereby incorporated by reference herein and made a part of this specification.

BACKGROUND OF THE DISCLOSURE

1. Field of the Disclosure

The disclosure relates to a method for detecting topology, a compute node and a storage node and particularly relates to a method for detecting topology without the need to use a specific wire to characterize the connection relationship between nodes, a compute node and a storage node.

2. Description of Related Art

Among the management costs of a current data center, maintenance of equipment accounts for a lot with the replacement of equipment and debugging making up the largest proportions. It is rather difficult to pinpoint the position of every server among tens of thousands of servers, and a variety of compute nodes, storage nodes and network switches connected to each other are present in the data centers. Therefore, maintenance by humans is highly difficult and complicated.

For example, when there is something wrong with a storage node in certain rack in the data center, the most concerned issue of the administrator is which compute nodes are currently connected to the storage node. If the administrator is able to obtain the information above, relevant problems may be solved faster, and the compute nodes may be re-connected to other available storage nodes to provide services continuously after the services of the malfunctioned compute node have be backed up. Therefore, it is important and valuable for the administrator to efficiently handle hardware topology (including the connection relationship between the compute node, the storage node and the network switch) in the whole data center.

In the current technology, topology in the data center may be obtained by a method of connecting the compute node and the storage node with a specific wire. The specific wire is, for example, a wire (for example, a Mini-SAS HD wire) with an electrically-erasable programmable read-only memory (EEPROM), and the administrator may have embedded the required information (such as data transmission speed, current connection status and a set of unique material numbers (e.g. a universally unique identifier, UUID)) into the EEPROM of the specific wire. Afterwards, the specific wire may be used to connect the compute node and the storage node. In doing so, the compute node and the storage node may see the same wire number through signals from a system end, such that the administrator may know that the two nodes are connected to each other.

However, the aforementioned approach not only may have higher costs for using the wires configured with the EEPROM, but also may have issues of being unsuccessfully written because the data on the EEPROM have to be maintained by humans.

SUMMARY OF THE DISCLOSURE

Accordingly, the disclosure provides a method for detecting topology, whereby a compute node and a storage node may respectively generate an identical connection identity to characterize a connection relationship between the compute node and the storage node without using a specific wire.

A method for detecting topology according to an embodiment of the disclosure is provided hereafter. A request including first identification information of a compute node is sent by the compute node to a storage node. A response including second identification information of the storage node is returned by the storage node to the compute node in response to the request. The first identification information and the second identification information are combined into a first connection identity by the compute node, and the first identification information and the second identification information are combined into a second connection identity by the storage node. The second connection identity is the same as the first connection identity.

According to an embodiment of the disclosure, the storage node and the compute node are both disposed in a data center.

According to an embodiment of the disclosure, the first identification information includes a serial number or a medium access control address of the compute node, and the second identification information includes a serial number or a medium access control address of the storage node.

According to an embodiment of the disclosure, the response further includes a bus serial number. The bus serial number corresponds to a bus port on the storage node. The bus port is connected to the compute node. A method according to another embodiment of the disclosure is provided hereafter. The bus serial number is added to the first connection identity and the second connection identity by the compute node and the storage node respectively according to a rule.

The disclosure provides a compute node including a storage circuit and a controller. The storage circuit stores a plurality of modules. The controller accesses the modules to perform the following steps. A request including identification information of the compute node is sent to a first storage node. A first response returned by the first storage node in response to the request is received. The first response includes first identification information of the first storage node. The identification information and the first identification information are combined into a first connection identity. The first connection identity is the same as a second connection identity generated by the first storage node through combining the identification information and the first identification information.

According to an embodiment of the disclosure, the first storage node and the compute node are both disposed in a data center.

According to an embodiment of the disclosure, the identification information includes a serial number or a medium access control address of the compute node, and the first identification information includes a serial number or a medium access control address of the first storage node.

According to an embodiment of the disclosure, the response further includes a first bus serial number. The first bus serial number corresponds to a first bus port that is on the first storage node and is connected to the compute node, and the controller is further configured to add the first bus serial number to the first connection identity.

According to an embodiment of the disclosure, functions of the controller according to an embodiment of the disclosure are provided hereafter. The request is sent to a second storage node. A second response returned by a second storage node in response to the request is received. The second response includes second identification information and a second bus serial number of the second storage node. The second bus serial number corresponds to a second bus port that is on the second storage node and is connected to the compute node. The identification information, the second identification information and the second bus serial number are combined into a third connection identity. The third connection identity is the same as a fourth connection identity generated by the second storage node through combining the identification information, the second identification information and the second bus serial number.

The disclosure provides a storage node including a storage circuit and a controller. The storage circuit stores a plurality of modules. The controller accesses the modules to perform the following steps. A first request from a first compute node is received. The first request includes first identification information of the first compute mode. A first response is returned to the first compute node in response to the first request. The first response includes identification information of the storage node. The identification information and the first identification information are combined into a first connection identity. The first connection identity is the same as a second connection identity generated by the first compute node through combining the identification information and the first identification information.

According to an embodiment of the disclosure, the storage node and the first compute node are both disposed in a data center.

According to an embodiment of the disclosure, the identification information includes a serial number or a medium access control address of the storage node, and the first identification information includes a serial number or a medium access control address of the first compute node.

According to an embodiment of the disclosure, the first response further includes a first bus serial number corresponding to a first bus port on the storage node. The first bus port is connected to the first compute node, and the controller is further configured to add the first bus serial number to the first connection identity.

According to an embodiment of the disclosure, functions of the controller are provided hereafter. A second request from a second compute node is received. The second request includes second identification information of the second compute node. A second response is returned to the second compute node in response to the second request. The second response includes identification information of the storage node and a second bus serial number. The second bus serial number corresponds to a second bus port that is on the storage node and is connected to the second compute node. The identification information, the second identification information and the second bus serial number are combined into a third connection identity. The third connection identity is the same as a fourth connection identity generated by the second compute node through combining the identification information, the second identification information and the second bus serial number.

In view of the foregoing, the compute node and the storage node according to the embodiments of the disclosure may combine the identification information thereof into a set of the same connection identity according to the same rule after the compute node and the storage node exchange the identification information thereof to characterize a connective relationship between the compute node and the storage node. In doing so, the data center may cost less in terms of maintenance and become more convenient to manage.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
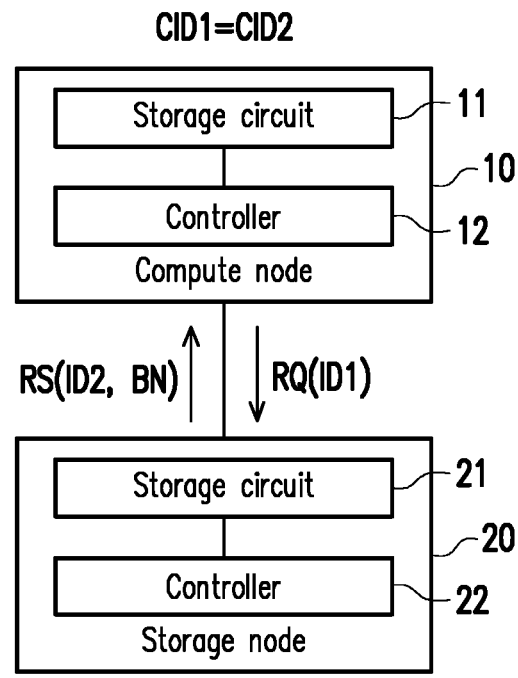
FIG. 1 is a schematic view of a compute node and a storage node according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic view of a compute node and a storage node according to an embodiment of the disclosure. In the embodiment, a compute node 10 and a storage node 20 may be disposed in a data center. More specifically, the compute node 10 and the storage node 20 may be disposed on the same rack and work together to provide functions such as cloud computing, cloud storage, etc., but are not limited thereto.

The compute node 10 includes a storage circuit 11 and a controller 12, and the storage node 20 includes a storage circuit 21 and a controller 22. The storage circuit 11 and the storage circuit 21 may be a memory, a hard disk drive or any other devices for storing data respectively, and may be configured to record a plurality of codes or modules.

The controller 12 is coupled to the storage circuit 11, and the controller 22 is coupled to the storage circuit 21. The controllers 12 and 22 may be a baseboard management controller (BMC) or one of any similar devices or a combination thereof respectively. In the embodiment of the disclosure, the controller 12 and the controller 22 may access the modules and codes in the storage circuit 11 and the storage circuit 21 respectively to perform the method identified in the embodiment of the disclosure. Further details are set out later.

Figure 2:
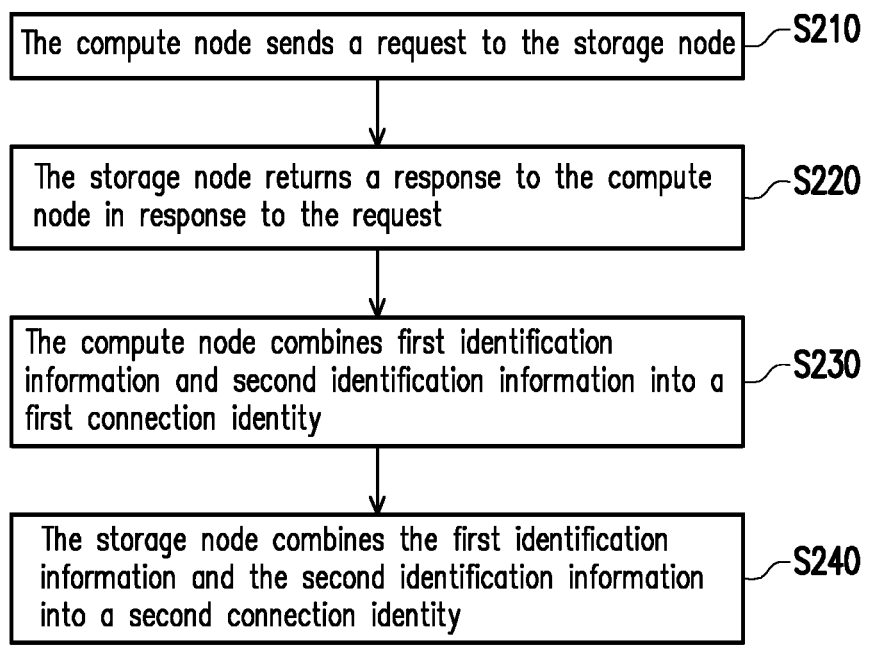
FIG. 2 is a flowchart illustrating a method for detecting topology according to an embodiment of the disclosure.

FIG. 2 is a flowchart illustrating a method for detecting topology according to an embodiment of the disclosure. The method according to the embodiment may be performed by the compute node 10 and the storage node 20 in FIG. 1. Details regarding each step of the method in FIG. 2 are described in accompanying with the elements shown in FIG. 1.

First, at step S210, the compute node 10 sends a request RQ to the storage node 20. In the embodiment, the request RQ includes identification information ID1 of the compute node 10. The identification information ID1 is, for example, the unique identity information dedicated to the compute node 10, such as a (hardware) serial number, a medium access control (MAC) address, but the disclosure is not limited thereto. In different embodiments, the compute node 10 may periodically or aperiodically send the request RQ to all the storage nodes (such as the storage node 20) connected to the compute node 10 to timely notify all the storage nodes connected to the compute node 10 that there exist a connection relationship between the compute node 10 and each storage nodes.

Afterwards, at step 220, the storage node 20 returns a response RS to the compute node 10 in response to the request RQ. In the embodiment, the response RS includes identification information ID2 of the storage node 20, and the identification information ID2 is, for example, the unique identity information dedicated to the storage node 20, such as a serial number, a MAC address, etc., but the disclosure is not limited thereto.

In various embodiments, the identification information ID1 of the compute node 10 and the identification information ID2 of the storage node 20 may belong to the same form or different forms of information. For example, if the identification information ID1 is a hardware serial number of the compute node 10, the identification information ID2 may be a hardware serial number, a MAC address of the storage node 20, or other unique identity information dedicated to the storage node 20. Similarly, if the identification information ID1 is a MAC address of the compute node 10, the identification information ID2 may still be the hardware serial number, the MAC address of the storage node 20, or other unique identity information dedicated to the storage node 20, but the disclosure is not limited thereto.

For facilitating the following discussions, the identification information ID1 is assumed to be the MAC address of the compute node 10, and the identification information ID2 is assumed to be the MAC address of the storage node 20, but the possible implementation of the disclosure is not limited thereto. Moreover, one of ordinary skill in the art may derive the embodiments in which the identification information ID1 and the identification information ID2 are implemented in information with other forms from the following teachings.

Next, at step S230, the compute node 10 combines the identification information ID1 and the identification information ID2 into a connection identity CID1. Moreover, at step S240, the storage node 20 combines the identification information ID1 and the identification information ID2 into a connection identity CID2. The connection identity CID1 generated by the computed node 10 is the same as the connection identity CID2 generated by the storage node 20. In other words, the compute node 10 and the storage node 20 combine the identification information ID1 and the identification information ID2 into the connection identity CID1 and the connection identity CID2 according to the same rule.

In the embodiment, the connection identity CID1 and the connection identity CID2 may characterize a connection relationship between the compute node 10 and the storage node 20 to facilitate the administrator to handle relevant topology more conveniently.

Further, when the storage node 20 is out of order, the administrator may observe the content of the connection identity CID2 to be aware that the compute node 10 is currently connected to the storage node 20. Accordingly, the services of the compute node 10 may be correspondingly backed up, and the compute node 10 may be re-connected to other available storage nodes.

Moreover, since it merely takes software to perform the method according to the embodiment of the disclosure without the need to connect the compute node 10 to the storage node 20 by a special wire, it is possible to reduce not only the cost of implementing the method but also the difficulty and complexity of maintenance.

For example, the compute node 10 to the storage node 20 may be simply connected by using a SAS wire with lower costs, and a bus interface such as an SAS expander board or a PCIe expansion board may be correspondingly disposed on the storage node 20 for the compute node 10 to be connected to.

In an embodiment, the compute node 10 and the storage node 20 may directly combine the identification information CID1 and the identification information CID2 to be in the form of "ID1:ID2" to generate the connection identity CID1 and the connection identity CID2. For example, if the identification information ID1 and the identification information ID2 are "e6:da:af:9e:5c:52" (which may be the MAC address of the compute node 10) and "00:26:2d:0b:bd:00" (which may be the MAC address of the storage node 20) respectively, the connection identity CID1 and the connection identity CID2 that are generated may be "e6:da:af:9e:5c:52:00:26:2d:0b:bd:00." In that case, if a problem occurs to the storage node 20, the administrator may be aware that the compute node 10 with the MAC address being "e6:da:af:9e:5c:52" is currently connected to the storage node 20 according to the connection identity CID2 on the storage node 20 and take appropriate actions.

In another embodiment, the connection identity CID1 and the connection identity CID2 may also be modified to be "ID2:ID1" or other similar forms, but the disclosure is not limited thereto.

In other embodiments, the storage node 20 may also place a bus serial number BN in the response RS, and the bus serial number BN may correspond to a bus port that is on the storage node 20 and is connected to the compute node 10. Correspondingly, the compute node 10 and the storage node 20 may add the bus serial number BN to the connection identity CID1 and the connection identity CID2 according to the same rule. For example, after adjustment, the connection identity CID1 and the connection identity CID2 may be, for example, in the form of "CID1:BN:CID2." In doing so, by observing the contents of the connection identity CID1 and the connection identity CID2, the administrator may specifically be aware which bus port on the storage node 20 is currently connected by the compute node 10. For example, if the compute node 10 is currently connected to the number one bus port on the storage node 20, the connection identity CID1 and the connection identity CID2 may correspondingly be adjusted to be "e6:da:af:9e:5c:52:1:00:26:2d:0b:bd:00." The figured "1" between the identification information ID1 and the identification information ID2 stands for the number one bus port on the storage node 20 to which the compute node 10 is currently connected.

Further, when there are several compute nodes connected to the storage node 20, the administrator may specifically be aware of relative relationships between the physical positions of these compute nodes by observing a plurality sets of connection identities on the storage node 20. For example, if the number one to number three bus ports, from left to right, are present on the storage node 20 and are connected to compute nodes A, B, and C respectively, the administrator may be aware that the compute node A is on the left side of the compute node B and that the compute node C is on the right side of the compute node B based on the connection identities corresponding to the compute node A, the compute node B and the compute node C. In doing so, the administrator may be able to obtain more complete information regarding topology and therefore the data center becomes more convenient to be handled.

Figure 3:
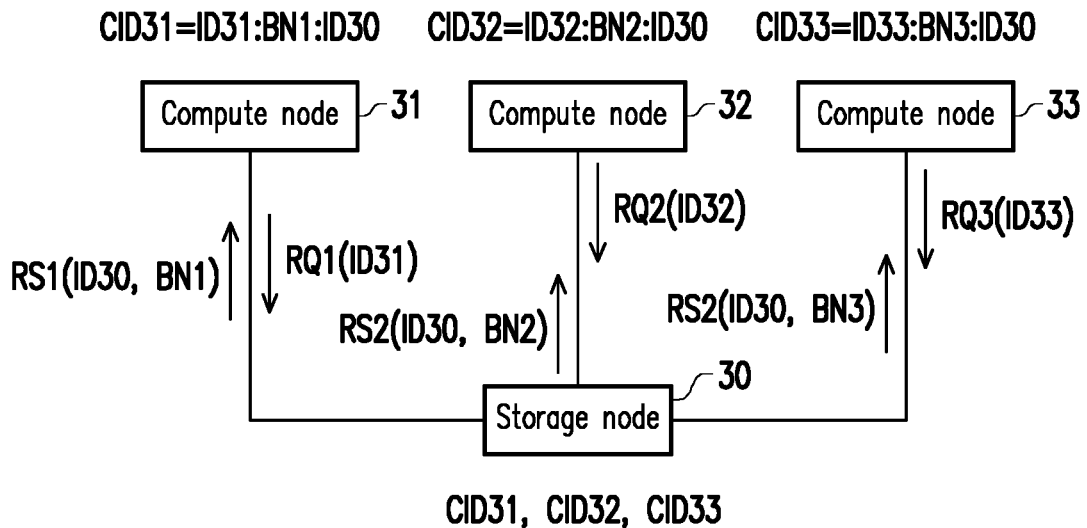
FIG. 3 is a schematic view of a plurality of compute nodes connected to a storage node according to an embodiment of the disclosure.

FIG. 3 is a schematic view of a plurality of compute nodes connected to a storage node according to an embodiment of the disclosure. In the embodiment, compute nodes 31, 32, and 33 are assumed to be connected to the number one to number three bus ports on a storage node 30. In that case, the compute node 31, the compute node 32 and the compute node 33 send respective identification information ID31, identification information ID32 and identification information ID33 thereof to the storage node 30 through requests RQ1, RQ2 and RQ3, respectively. Correspondingly, the storage node 30 may return responses RS1, RS2, and RS3 to the compute node 31, the compute node 32 and the compute node 33 to inform the identification information ID30 of the storage node 30 and bus serial numbers BN1, BN2 and BN3 which the compute node 31, the compute node 32 and the compute node 33 correspond to respectively.

Next, the compute node 31, the compute node 32 and the compute node 33 may generate connection identities CID31, CID32 and CID33 respectively based on the teachings from the aforementioned embodiments. The connection identity CID31 characterizes a connection relationship between the compute node 31 and the storage node 30, the connection identity CID32 characterizes a connection relationship between the compute node 32 and the storage node 30, and the connection identity CID33 characterizes a connection relationship between the compute node 33 and the storage node 30. Correspondingly, the storage node 30 may also generate the connection identity CID31, the connection identity CID32 and the connection identity CID33 based on the teachings from the aforementioned embodiments.

In doing so, the administrator may be aware of the connection relationships among the storage node 30, the compute node 31, the compute node 32 and the compute node 33 based on the connection identity CID31, the connection identity CID32, and the connection identity CID33 to obtain relevant topology more conveniently and at low costs.

Figure 4:
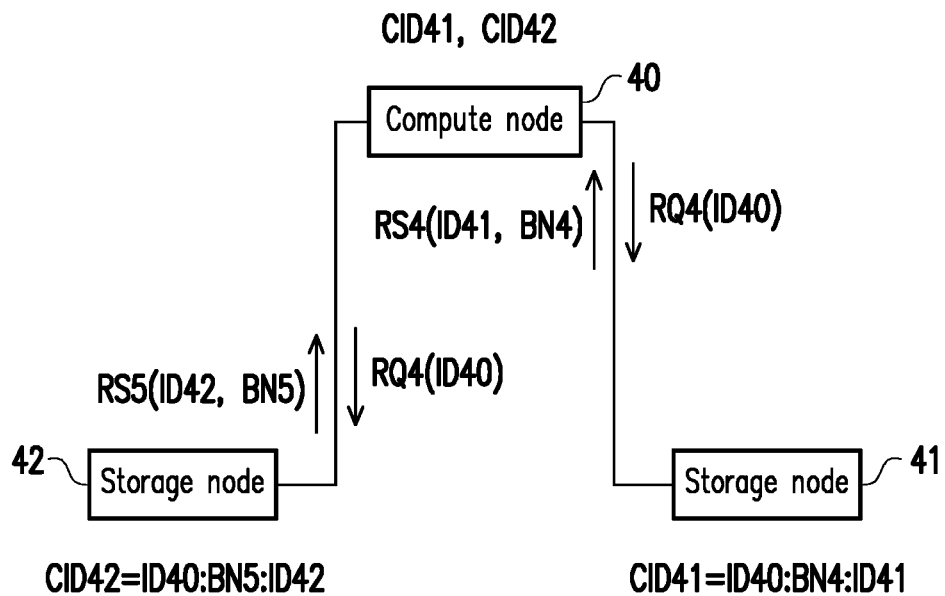
FIG. 4 is a schematic view of a compute node connected to a plurality of storage nodes according to an embodiment of the disclosure.

FIG. 4 is a schematic view of a compute node connected to a plurality of storage nodes according to an embodiment of the disclosure. In the embodiment, a compute node 40 is assumed to be connected to a bus port of a storage node 41 and a bus port of a storage node 42. In that case, the compute node 40 may send a request RQ4 to the storage node 41 and the storage node 42 to transmit identification information ID40 to the storage node 41 and the storage node 42. Correspondingly, the storage node 41 and the storage node 42 may return a response RS4 and a response RS5 to the compute node 40, respectively. The response RS4 may include identification information ID41 of the storage node 41 and a bus serial number BN4 on the storage node 41 corresponding to the compute node 40, and the response RS5 may include identification information ID42 of the storage node 42 and a bus serial number BN5 on the storage node 42 corresponding to the compute node 40.

Next, the compute node 40 may generate connection identities CID41 and CID42 based on the teachings from the aforementioned embodiments. The connection identity CID41 characterizes a connection relationship between the compute node 40 and the storage node 41, and the connection identity CID42 characterizes a connection relationship between the compute node 40 and the storage node 42. Correspondingly, the storage node 41 and the storage node 42 may also generate the connection identity CID41 and the connection identity CID42 respectively based on the teachings from the aforementioned embodiments.

In doing so, the administrator may be aware of the connection relationships among the compute node 40, the storage node 41 and the storage node 42 based on the connection identity CID41 and the connection identity CID42 to obtain relevant topology more conveniently and at low costs.

In other embodiments, the embodiments in FIGS. 3 and 4 may be combined to show more complicated aspects of topology, wherein a compute node may be connected to a plurality of storage nodes at the same time, and the storage nodes may also be connected to a plurality of compute nodes. In that case, each of the compute nodes and each of the storage nodes may generate one or more sets of connection identities based on the teachings from the aforementioned embodiments to allow the administrator to obtain information regarding topology. The details of the operation will not be repeated herein.

In view of the foregoing, after exchanging identification information of each other, each of the compute node and the storage node of the disclosure may combine the identification information thereof with the identification information of the other according to the same rule to generate the same connection identity to characterize the connection relationship between the compute node and the storage node. Since the method according to the embodiments of the disclosure only needs to apply to software without the need to connecting the compute node to the storage node with the specific wire, not only the costs of implementation may be lowered, but the difficulty and complexity of maintenance may also be reduced as well. Moreover, in the embodiments of the disclosure, by adding the information of the bus serial number to the connection identity, the administrator may be allowed to be aware of the relative positions of the plurality of compute nodes connected to the same storage node more definitely.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for detecting topology, comprising:
    sending a request to a storage node by a compute node, wherein the request comprises first identification information of the compute node;
    returning a response to the compute node in response to the request by the storage node, wherein the response comprises second identification information of the storage node;
    combining the first identification information and the second identification information into a first connection identity by the compute node; and
    combining the first identification information and the second identification information into a second connection identity by the storage node, wherein the second connection identity is the same as the first connection identity.

2. The method of claim 1, wherein the storage node and the compute node are both disposed in a data center.

3. The method of claim 1, wherein the first identification information comprises a serial number or a medium access control address of the compute node, and the second identification information comprises a serial number or a medium access control address of the storage node.

4. The method of claim 1, wherein the response further comprises a bus serial number corresponding to a bus port on the storage node that is connected to the compute node, the method further comprising:
adding the bus serial number to the first connection identity and the second connection identity by the compute node and the storage node respectively according to a rule.

5. A compute node, comprising:
a storage circuit, storing a plurality of modules;
a controller, accessing the modules to perform the following steps:
sending a request to a first storage node, wherein the request comprises identification information of the compute node;
receiving a first response returned by the first storage node in response to the request, wherein the first response comprises first identification information of the first storage node; and
combining the identification information and the first identification information into a first connection identity, wherein the first connection identity is the same as a second connection identity generated by the first storage node through combining the identification information and the first identification information.

6. The compute node of claim 5, wherein the first storage node and the compute node are both disposed in a data center.

7. The compute node of claim 5, wherein the identification information comprises a serial number or a medium access control address of the compute node, and the first identification information comprises a serial number or a medium access control address of the first storage node.

8. The compute node of claim 5, wherein the response further comprises a first bus serial number corresponding to a first bus port that is on the first storage node and is connected to the compute node, and the controller is further configured to add the first bus serial number to the first connection identity.

9. The compute node of claim 8, wherein the controller is further configured to:
send the request to a second storage node;
receive a second response returned by the second storage node in response to the request, wherein the second response comprises second identification information and a second bus serial number of the second storage node, and the second bus serial number corresponds to a second bus port that is on the second storage node and is connected to the compute node; and
combine the identification information, the second identification information and the second bus serial number into a third connection identity, wherein the third connection identity is the same as a fourth connection identity generated by the second storage node through combining the identification information, the second identification information and the second bus serial number.

10. A storage node, comprising:
a storage circuit, storing a plurality of modules;
a controller, accessing the modules to perform the following steps:
receiving a first request from a first compute node, wherein the first request comprises first identification information of the first compute node;
returning a first response to the first compute node in response to the first request, wherein the first response comprises identification information of the storage node; and
combining the identification information and the first identification information into a first connection identity, wherein the first connection identity is the same as a second connection identity generated by the first compute node through combining the identification information and the first identification information.

11. The storage node of claim 10, wherein the storage node and the first compute node are both disposed in a data center.

12. The storage node of claim 10, wherein the identification information comprises a serial number or a medium access control address of the storage node, and the first identification information comprises a serial number or a medium access control address of the first compute node.

13. The storage node of claim 10, wherein the first response further comprises a first bus serial number corresponding to a first bus port that is on the storage node and is connected to the first compute node, and the controller is further configured to add the first bus serial number to the first connection identity.

14. The storage node of claim 13, wherein the controller is further configured to:
receive a second request from a second compute node, wherein the second request comprises second identification information of the second compute node;
return a second response to the second compute node in response to the second request, wherein the second response comprises the identification information of the storage node and a second bus serial number that corresponds to a second bus port that is on the storage node and is connected to the second compute node; and
combine the identification information, the second identification information and the second bus serial number into a third connection identity, wherein the third connection identity is the same as a fourth connection identity generated by the second compute node through combining the identification information, the second identification information and the second bus serial number.

* * * * *